US006975763B2

(12) United States Patent
Shiota (10) Patent No.: US 6,975,763 B2
(45) Date of Patent: Dec. 13, 2005

(54) SHADE COMPONENT REMOVING APPARATUS AND SHADE COMPONENT REMOVING METHOD FOR REMOVING SHADE IN IMAGE

(75) Inventor: Natsuko Shiota, Hirakata (JP)

(73) Assignee: Minolta Co., Ltd., Osaka (JP)

(*) Notice: Subject to any disclaimer, the term of this patent is extended or adjusted under 35 U.S.C. 154(b) by 686 days.

(21) Appl. No.: 09/902,098

(22) Filed: Jul. 11, 2001

(65) Prior Publication Data

US 2002/0006226 A1 Jan. 17, 2002

(30) Foreign Application Priority Data

Jul. 12, 2000 (JP) .............................. 2000-211190

(51) Int. Cl.[7] .............................................. G06K 9/46
(52) U.S. Cl. ...................... 382/203; 345/419; 345/441; 345/582; 345/617; 345/646; 382/103; 382/118; 382/154; 382/165; 382/225; 382/253
(58) Field of Search ................................ 345/419, 441, 345/582, 617, 646; 382/103, 115, 118, 154, 382/165, 170, 190, 199, 203, 206, 225, 227, 382/253

(56) References Cited

U.S. PATENT DOCUMENTS

| 5,388,167 | A | * | 2/1995 | Koga et al. ................. 382/232 |
| 5,842,194 | A | * | 11/1998 | Arbuckle ....................... 706/52 |
| 5,844,573 | A | * | 12/1998 | Poggio et al. ............... 345/441 |
| RE36,041 | E | * | 1/1999 | Turk et al. ................... 382/118 |
| 5,881,164 | A | * | 3/1999 | Ichikawa ..................... 382/149 |
| 5,901,244 | A | * | 5/1999 | Souma et al. ............... 382/190 |
| 5,917,957 | A | * | 6/1999 | Ichikawa ..................... 382/274 |
| 6,044,168 | A | * | 3/2000 | Tuceryan et al. ........... 382/118 |
| 6,088,470 | A | * | 7/2000 | Camus et al. ............... 382/117 |
| 6,122,408 | A | * | 9/2000 | Fang et al. .................. 382/274 |
| 6,185,337 | B1 | * | 2/2001 | Tsujino et al. .............. 382/227 |
| 6,345,109 | B1 | * | 2/2002 | Souma et al. ............... 382/118 |
| 6,430,306 | B2 | * | 8/2002 | Slocum et al. .............. 382/118 |
| 6,430,307 | B1 | * | 8/2002 | Souma et al. ............... 382/118 |
| 6,466,685 | B1 | * | 10/2002 | Fukui et al. ................. 382/115 |
| 6,516,247 | B2 | * | 2/2003 | Funada ........................ 700/245 |
| 6,556,196 | B1 | * | 4/2003 | Blanz et al. ................. 345/419 |
| 6,625,303 | B1 | * | 9/2003 | Young et al. ................ 382/132 |
| 6,681,032 | B2 | * | 1/2004 | Bortolussi et al. .......... 382/118 |
| 6,697,505 | B2 | * | 2/2004 | Yamaguchi et al. ........ 382/118 |

FOREIGN PATENT DOCUMENTS

| JP | 6-342465 | 12/1994 |
| JP | 11-185025 | 7/1999 |
| JP | 2000-30065 | 1/2000 |

* cited by examiner

*Primary Examiner*—Bhavesh M. Mehta
*Assistant Examiner*—Gregory Desire
(74) *Attorney, Agent, or Firm*—McDermott Will & Emery LLP (57) ABSTRACT

An apparatus for removing a shade from an image includes a principle component analyzing unit performing principle component analysis on a set of face images having various types of shades to generate an eigen space, a storing unit storing the eigen space generated by the principle component analyzing unit, an image input unit receiving as an input a new face image, a projecting unit projecting the face image input through the image input unit to the eigen space stored in the storing unit, and an image producing unit producing a face image with the shade component removed, based on the face image input through the image input unit and the image projected to the eigen space by the projecting unit.

11 Claims, 5 Drawing Sheets

SHADE COMPONENT REMOVING APPARATUS AND SHADE COMPONENT REMOVING METHOD FOR REMOVING SHADE IN IMAGE

This application is based on Application No. 2000-211190 filed in Japan, the content of which is hereby incorporated by reference.

BACKGROUND OF THE INVENTION

1. Field of the Invention

The present invention relates to an apparatus and method for removing a shade component from an image.

2. Description of the Related Art

Recently, studies have been made to perform statistical image processing, using face images obtained by picking-up faces of persons by a camera. One example is a technique of specifying a person represented by the face image, as an application of the statistical image processing.

In the statistical image processing, a process is necessary to remove difference in conditions of image pickup from the face images as the statistical samples. Under different image pick-up conditions, light directions to one's face differ. Namely, shades appear at different portions of the picked-up face images of one same person, and hence, the one same person may possibly be erroneously recognized as a different person, when recognition is made only from the face images.

Techniques for removing shade component from face images are discussed in Japanese Patent Laying-Open Nos. 11-185025, 6-342465 and 2000-30065.

Japanese Patent Laying-Open No. 11-185025 describes a technique in which a face image is folded over at a symmetry axis of the face, and the image before folding and the image after folding are added, so as to approximate a face image that is illuminated from the front side.

Japanese Patent Laying-Open No. 6-342465 describes a technique in which a two-dimensional face image is approximated to a three-dimensional elliptical sphere, and reflected light is separated and produced from the transformed 3-dimensional face image, so as to remove the shade component.

Japanese Patent Laying-Open No. 2000-30065 describes a technique in which a set of face images of persons as the objects of recognition picked-up in advance with uniform illuminating condition are used to extract conditions other than the illumination condition, to enable recognition.

The technique described in Japanese Patent Laying-Open No. 11-185025 uses an image obtained by folding the face image on the symmetry axis. Therefore, though it is possible to remove shade from a face image picked-up under such illuminating condition in that the light comes from the left or right direction from one's face, it is impossible to remove the shade from the face image picked-up under such an illuminating condition in that light comes from the upper or lower direction or from the front or back direction.

The technique described in Japanese Patent Laying-Open No. 6-342465 involves complicated and difficult process for transforming a two-dimensional face image to a three-dimensional image of elliptical sphere. Further, as the actual face of a person is different from the elliptical sphere, shades generated at portions different from the elliptical sphere, such as the shade at one's nose, cannot be correctly separated and produced.

The technique described in Japanese Patent Laying-Open No. 2000-30065 requires preparation of face images of persons as objects of recognition by picking-up the images under the same illumination condition, which imposes severe burden.

SUMMARY OF THE INVENTION

The present invention was made to solve the above described problems. An object of the present invention is to provide a method and apparatus for removing a shade component from an image, that enables easy removal of the shade component from a face image.

Another object of the present invention is to provide an apparatus and a method of removing a shade component from an image, enabling removal of the shade component no matter from what direction the light comes to cause the shade.

The above described objects can be attained by an apparatus for removing a shade component from an image in accordance with an aspect of the present invention, which includes a calculating unit performing a principle component analysis on a set of face images having various types of shades to generate an eigen space, a storing unit storing the eigen space generated by the calculating unit, an input unit receiving as an input a new face image, a projecting unit projecting the face image input through the input unit to the eigen space stored in the storing unit, and a producing unit producing a face image with the shade component removed, based on the face image input through the input unit and the image projected to the eigen space by the projecting unit.

According to the present invention, an apparatus for removing a shade component from an image is provided that can remove the shade from the face image even when there is a shade on the input face image. Further, as the face image with the shade component removed is produced based on the input face image and the image projected to the eigen space, an apparatus for removing a shade component from an image is provided that can remove the shade no matter from which direction the light comes to cause the shade on the input face image.

Preferably, the calculating unit of the apparatus for removing a shade component from the image includes a face component extracting unit extracting a shape of each portion of respective face images, a mean shape calculating unit calculating a mean shape for the set of face images, a mean shape transforming unit transforming each face image to the calculated mean shape, and a principle component analyzing unit performing principle component analysis on the face image transformed to the mean shape to calculate the eigen vectors.

According to the present invention, as the input face image is transformed to a mean shape, it is possible to perform principle component analysis considering only the texture information of the face image. As a result, an apparatus for removing a shade component from an image is provided that can easily extract the shade component appearing on the face image can be provided.

Preferably, the projecting unit of the apparatus for removing a shade component from the image includes a face component extracting unit extracting a shape of each portion of the input face image, a mean shape transforming unit transforming the input face image to a mean shape calculated by the calculating unit, and an eigen space projecting unit projecting the face image that has been transformed to the mean shape to the eigen space.

According to the present invention, as the shape of the newly input face image is adjusted to the shape of the face image represented by the eigen space, it is possible to correctly project the texture of the newly input face image to the eigen space. Further, an apparatus for removing a shade component from an image that is capable of removing the shade component more correctly is provided.

More preferably, the producing unit of the apparatus for removing a shade component from the image calculates a difference component between the image projected to the eigen space and the image obtained by removing the shade component by projecting to the eigen space, and subtracts the difference component from the face image input through the input unit, whereby a face image with the shade component removed is produced.

According to the present invention, an apparatus for removing a shade component from an image is provided that can easily remove the shade component from the input face image.

More preferably, in the apparatus for removing a shade component from an image, the first to third or fourth components of the image projected to the eigen space represent images influence by the shade component.

According to the present invention, the image projected to the eigen space has the first to third or fourth components influenced by the shade component, and therefore, the influence of the shade component can be removed effectively.

More preferably, the apparatus for removing a shade component from an image further includes an inverse transforming unit to recover original shape, that transforms the shape of the face image produced by the producing unit from the mean shape to the shape of the original face image.

According to the present invention, the shade appearing on the original face image can be removed.

According to another aspect of the present invention, the apparatus for removing a shade component from an image includes a calculating unit performing a statistical process on a set of images having various types of shades and calculating a prescribed image space, a storing unit storing an image space calculated by the calculating unit, an input unit receiving as an input a new image, a projecting unit projecting the image input through the input unit to the image space stored in the storing unit, and a producing unit producing an image with the shade component removed, based on the image input through the input unit and the image projected to the image space by the projecting unit.

According to the present invention, an apparatus for removing a shade component from an image is provided that can remove the shade from the face image even when there is a shade on the input face image. Further, as the face image with the shade component removed is produced based on the input image and the image projected to the eigen space, an apparatus for removing a shade component from an image is provided that can remove the shade no matter from which direction the light comes to cause the shade on the input face image.

Preferably, the images having various types of shades included in the set and the image input through the input unit represent subjects of the same type.

According to the present invention, as the images represent subjects of the same type, it is possible to remove the shade component more accurately.

According to a still further aspect of the present invention, a method of removing a shade component from an image includes the steps of: performing principle component analysis on a plurality of face images having various types of shades, the step of performing principle component analysis including calculating eigen vectors and eigen values using an eigen space method regarding pixel values of the face image as vectors; forming a dictionary space using the calculated eigen vectors as base vectors; forming a shade component removed space having a lower order component obtained through the step of principle component analysis as a base vector; generating a dictionary image by applying a face image of which shade component is to be removed to the dictionary space; generating a removal image by applying the face image from which the shade component is to be removed to the shade component removed space; subtracting a difference between the dictionary image and the removal image from the face image from which the shade component is to be removed, to generate a face image with the shade component removed.

According to the present invention, the method of removing shade component from an image is provided that can remove shades from a face image. Further, the method of removing a shade component from an image is provided that can remove the shade no matter from which direction the light comes to cause the shade on the face image.

Preferably, the plurality of face images having various types of shades are images transformed to mean shape obtained by averaging shapes of a plurality of original face images, the face image from which the shade component is to be removed is an image transformed to the mean shape, and the method further includes the step of inverse transformation, performing inverse transformation of the face image with the shade component removed, so as to recover the shape of the original face image from the face image with the shade component removed.

According to the present invention, as the input face image is transformed to a mean shape, it is possible to perform principle component analysis considering only the texture information of the face image. As a result, the method of removing a shade component from an image is provided that can easily extract the shade component appearing on the face image can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the figures. In the figures, the same reference characters denote the same or corresponding portions.

Figure 1:
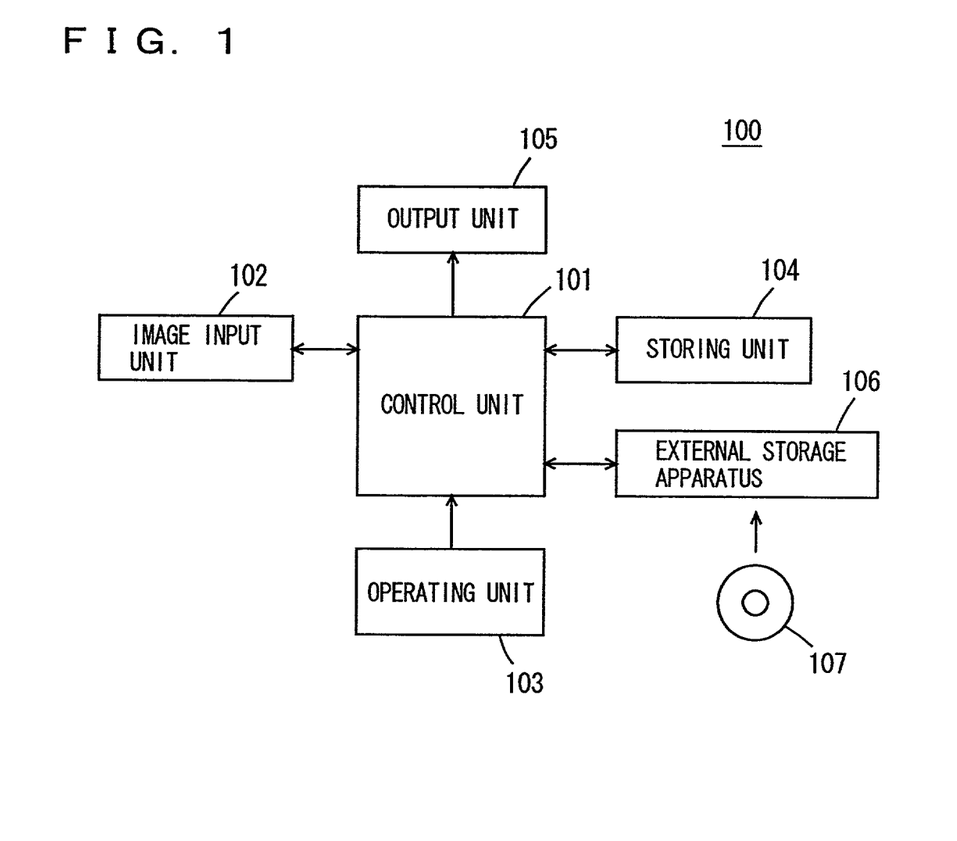
FIG. 1 is a block diagram showing a schematic configuration of the shade component removing apparatus in accordance with one embodiment of the present invention.

FIG. 1 is a block diagram showing a schematic configuration of the shade component removing apparatus in accordance with an embodiment of the present invention. Referring to the figure, the shade component removing apparatus 100 includes a control unit 101, an image input unit 102 receiving as an input an image of one's face, an operating unit 103 used by a user of the apparatus for inputting data and various instructions, a storing unit 104 storing information and the like necessary for control unit 101 to execute the program and various data, an output unit 105 for outputting an image, and an external storing apparatus 106.

Control unit 101 is implemented by a central processing unit (CPU) that controls the shade component removing apparatus 100 as a whole. Image input unit 102 is an image scanner, having a line-type CCD (Charge Coupled Device) sensor. It may read a photograph or the like representing a face image, and output a two-dimensional face image. A digital camera or the like that can pick-up an actual person and can output a two-dimensional face image may be used as the image input unit. Alternatively, the image input unit may be an input terminal connected to an external image scanner, a digital camera or the like.

Storing unit 104 includes an ROM (Read Only Memory) storing a program to be executed by control unit 101, an RAM (Random Access Memory) for temporarily storing variables and the like necessary for control unit 101 to execute the program, and a hard disk storing various data.

Output unit 105 is a display for displaying the image input through the image input unit 102 or the image after image processing. A printer may be used in addition to the display.

The external storing apparatus 106 is a drive for reading information recorded on a recording medium 107. The recording medium 107 may be a magneto-optical disk, a digital video disk, a compact disk or the like. The external storing apparatus 106 is capable of writing the image with the shade component removed by control unit 101 to recording medium 107.

When a shade removing program is stored in recording medium 107, the program may be read by external storing apparatus 106 and recorded on a hard disk of storing unit 104, or the program may be read out from the recording medium, so as to execute the program directly. When a face image is stored in recording medium 107, external storing apparatus 106 plays the same roll as input unit 102, as external storing apparatus 106 reads the face image. Further, external storing unit 106 is also capable of writing the image with the shade component removed and the like, to recording medium 107.

Figure 2:
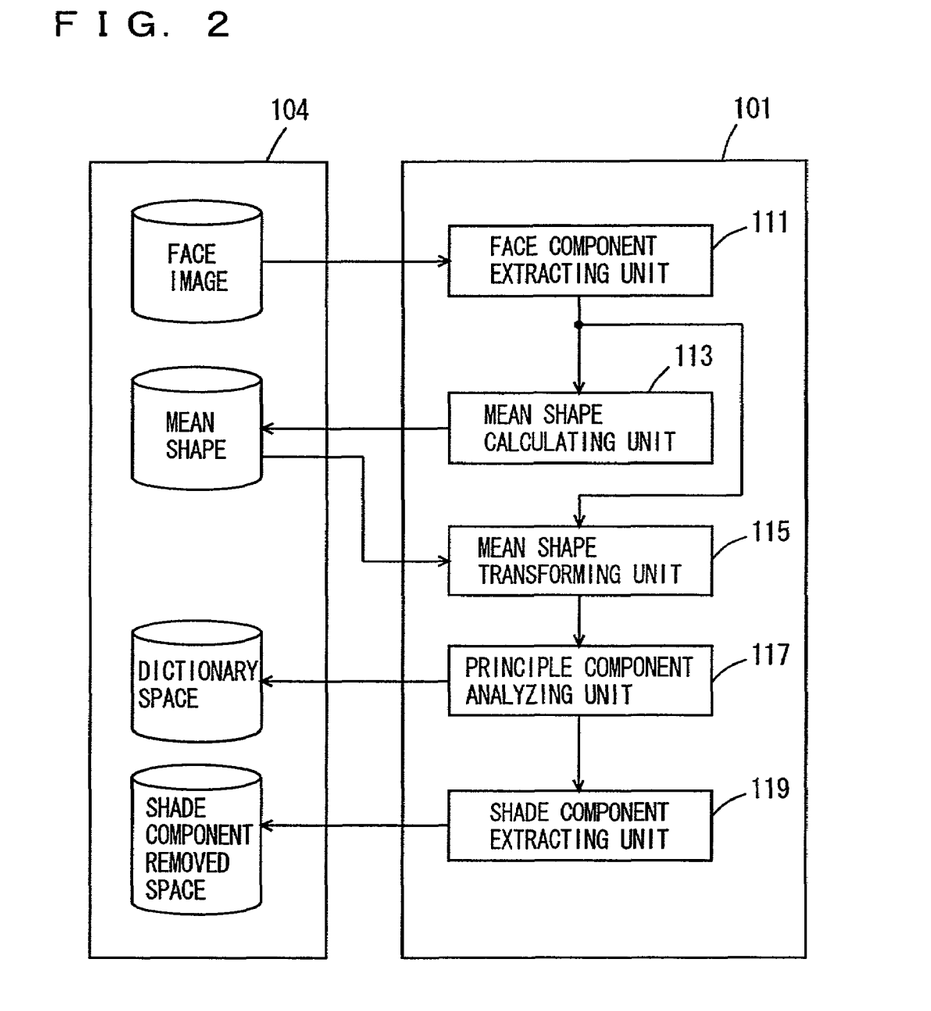
FIG. 2 is a functional block diagram showing an outline of a function of forming a shade component dictionary of the shade component removing apparatus.

FIG. 2 is a functional block diagram schematically showing the function of forming shade component dictionary as one of functions of the shade component removing apparatus. Referring to FIG. 2, control unit 101 includes a face component extracting unit 111 extracting shape of each portion of the face from the face image, a mean shape calculating unit 113 calculating a mean shape for the set of face images stored in a face image data base, a mean shape transforming unit 115 transforming a face image to the mean shape to generate a mean face image, a principle component analyzing unit 117 performing principle component analysis on the mean face image to generate a dictionary space, and a shade component extracting unit 119 extracting the shade component from the produced dictionary space to produce the shade component removed space.

Storing unit 104 stores the face image data base including human faces, the mean shape calculated by the mean shape calculating unit 113, the dictionary space generated by principle component analyzing unit 117, and the shade component removed space generated by shade component extracting unit 119.

The face image data base in the storing unit 104 includes a plurality of images representing human faces (hereinafter referred to as "face images"). The face image is input through image input unit 102 to be stored in storing unit 104. Also face images stored on a recording medium 107 may be read through external storing apparatus 106 and stored in storing unit 104. The face images stored in the face image data base may include a plurality of images for each of a plurality of persons, or one for each of the plurality of persons. Alternatively, the images may be a plurality of images of one person.

Among the plurality of face images, the light from the light source illuminating the face as a subject should be different from each other. Therefore, it is preferred that the plurality of face images are not those images obtained with the face illuminated from one direction, but those images obtained with the direction of the light illuminating the face changed variously. The direction of the light illuminating the subject has three degrees of freedom in up/down direction, left/right direction and forward/backward direction. It is preferred that the face images are picked-up with the directions of illuminating light made different at least in one of these three degrees of freedom. Further, it is desired that in the plurality of face images, the directions of light illuminating the subject at the time of image picked-up are distributed uniformly and not biased to one of the aforementioned three degrees of freedom.

Therefore, it is preferred that the face images stored in the image data base include a plurality of face images of a plurality of persons picked-up with the illuminating conditions changed variously.

The face component extracting unit 111 extracts face contour and respective portions of the face such as eyes, nose, mouth and eyebrows included in the face image, for each of the face images stored in the face image data base of the storing unit 104, and recognizes the shapes of these portions.

The shape recognition performed by the face component extracting unit 111 may be realized by the method of manually designating a predetermined feature point. The feature point refers to a point common to different persons, such as a corner of the mouth or a corner of the eye. When the operator viewing the face image displayed on the display of output unit 105 designates a feature point by a pointing device such as a mouth provided at the operating unit 103, the position of the feature point is input. As the position of the feature point is input, it becomes possible to recognize shapes of the face contour and various portions of the face.

Alternatively, the positions of feature points of various portions of the face and the face contour can be extracted by combining image processing techniques such as edge detecting process and color extracting process.

The mean shape calculating unit 113 forms a set of the face images stored in the face image data base of storing unit 104, and calculates a mean shape of the face for the set of face images. The calculated mean shape is stored in storing unit 104. The mean shape is calculated by using the feature points recognized by the face component extracting unit 111. Calculation of the mean shape is performed by using a normalized image, in which the face image is normalized in terms of the face size. The normalized image refers to an image in which the area of the face and length between various portions of the face are made constant. An origin is determined in the normalized image, and mean position of each feature point is calculated. The origin may be an intersection of an X axis and a Y axis, where X axis is the line connecting feature points of left and right eye corners, and Y axis is the central line in the vertical direction of the face.

Mean shape transforming unit 115 generates mean face images by transforming the face images included in the set to the mean shape. This operation is performed by using the feature points and regions other than feature points are also transformed by linear transformation. In the transformation to the mean shape, coordinates of pixels are transformed to corresponding coordinates of the mean shape, for every pixel of the face images included in the set. Consequently, mean face images having the same facial shape but different textures are generated, that are same in number as the face images included in the set.

Principle component analyzing unit 117 regards the pixel values of the mean face image as a vector, and calculate the eigen vectors and the eigen values using the eigen space method. The calculated eigen vectors are stored in storing unit 104, as a dictionary space having these as base vectors.

Shade component extracting unit 119 extracts the shade component from the dictionary space generated by the principle component analyzing unit 117 and generates the shade component removed space. In the dictionary space generated by principle component analyzing unit 117, the influence of the illuminating condition appears from the first to fourth components, which have larger eigen values in this order. Shade component extracting unit 119 stores in storing unit 104 the fifth and the following components of the eigen vectors defining the dictionary space, as the shade component removed space having these components as base vectors. The first to fourth components represent offset component for normalizing the texture of the face image transformed to the mean shape and the components of three degrees of freedom in the direction of light source as the illuminating condition.

When the face image stored in the face image data base of storing unit 104 is an image with the texture normalized, the influence of illuminating condition appears from the first to third components having larger eigen value in this order, in the dictionary space generated by the principle component analyzing unit 117. Therefore, shade component extracting unit 119 stores the fourth and the following components of the eigen vectors defining the dictionary space, as the shade component removed space having these as base vectors. The first to third components represent components of the three degrees of freedom of the light source direction as the illuminating condition.

Here, for texture normalization, histogram normalization in which histograms of pixel values are made equal between each of the face images, or normalization used in the active appearance model (AAM) proposed by Coot et. al. of Manchester University may be used.

Figure 3:
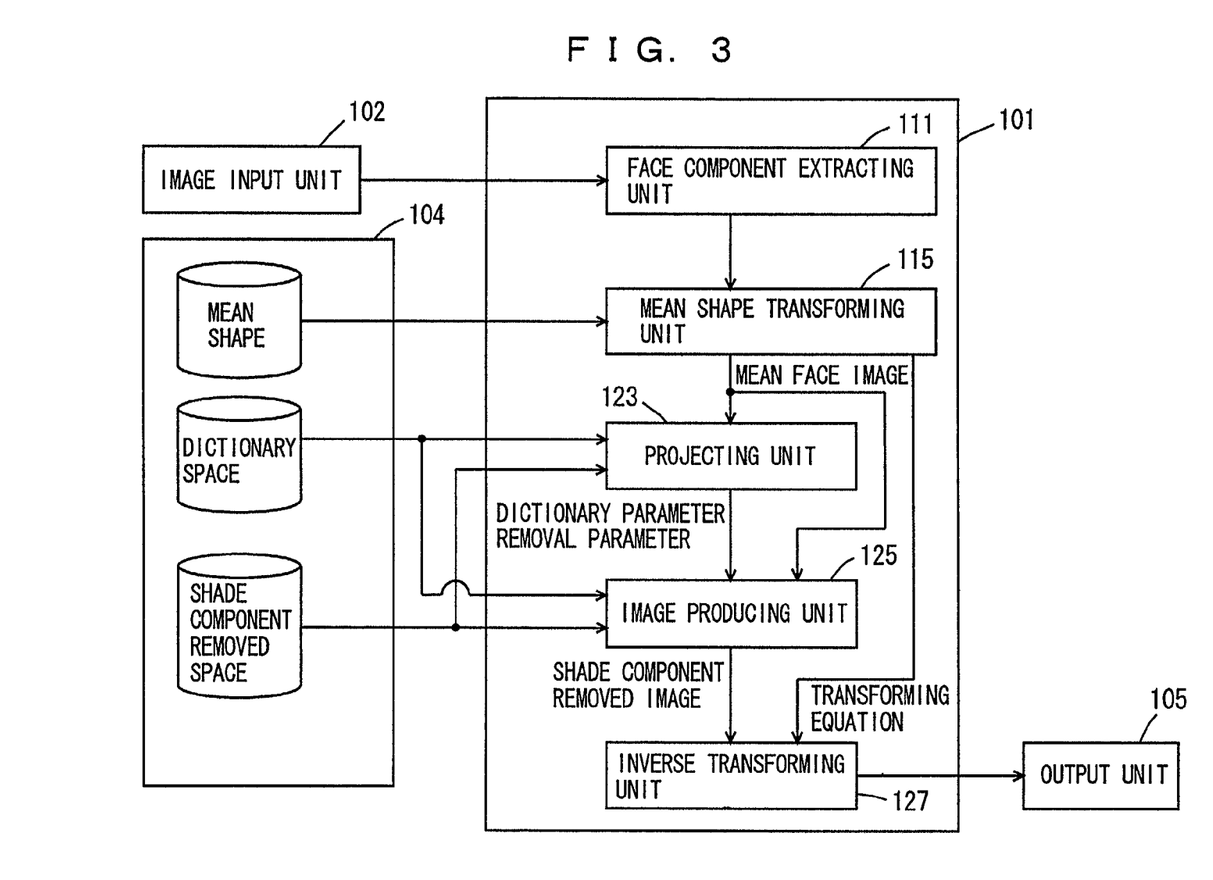
FIG. 3 is a functional block diagram showing an outline of a function of producing a shade component removed image of the shade component removing apparatus.

FIG. 3 is a functional block diagram representing an outline of the function of producing the shade component removed image as another function of the shade component removing apparatus. Referring to FIG. 3, control unit 101 includes a face component extracting unit 111 extracting shape of each portion of the face from the face image input through image input unit 102, a mean shape transforming unit 115 transforming the face image to a mean shape and generating a mean face image, a projecting unit 123 projecting the mean face image to the dictionary space and projecting the mean face image to the shade component removed space to generate a removal image, an image producing unit 125 producing the shade component removed image, that is, the mean face image with the shade component removed, based on the mean face image, the dictionary image and the removal image, and an inverse transforming unit 127 for inverse-transforming the shade component removed image to the original shape.

Face component extracting unit 111 extracts, from the face image newly input through image input unit 102, the face contour and portions such as eyes, nose, mouth and eye brows included in the face image, and recognizes the shapes thereof.

The mean shape transforming unit 115 transforms the face image newly input through the image input unit 102 to the mean shape. The image obtained by transforming the face image to the mean shape is referred to as the mean face image. The mean shape is the mean shape previously calculated by the mean shape calculating unit 113 described above and stored in storing unit 104. The transformation equation to the mean shape is transmitted to the inverse transforming unit 127, which will be described later.

Projecting unit 123 projects the mean face image to the dictionary space and finds the dictionary parameter. The found dictionary parameter is transmitted to image producing unit 125. Further, projecting unit 123 projects the mean face image to the shade component removed space, to find a removal parameter. The found removal parameter is transmitted to image producing unit 125.

In the dictionary space, an image represented by the dictionary parameter is referred to as a dictionary image. In the shade component removed space, an image represented by the removal parameter is referred to as removal image.

Image producing unit 125 calculates corresponding pixel values in the mean face image, dictionary image and the removal image in accordance with the equation (1), to produce a shade component removed image, that is, the face image with the shade component removed.

$$\text{Shade component removed image} = \text{mean face image} - (\text{dictionary image} - \text{removal image}) \quad (1)$$

The inverse transforming unit 127 performs inverse transformation of the shade component removed image, using the transformation equation found by the mean shape transforming unit 115. Thus, the shape of the shade component removed image is transformed to the shape of the input face image. The shape image transformed to the original shape is output from the output unit 105. Alternatively, the resulting face image may be stored in the storing unit 104.

Figure 4:
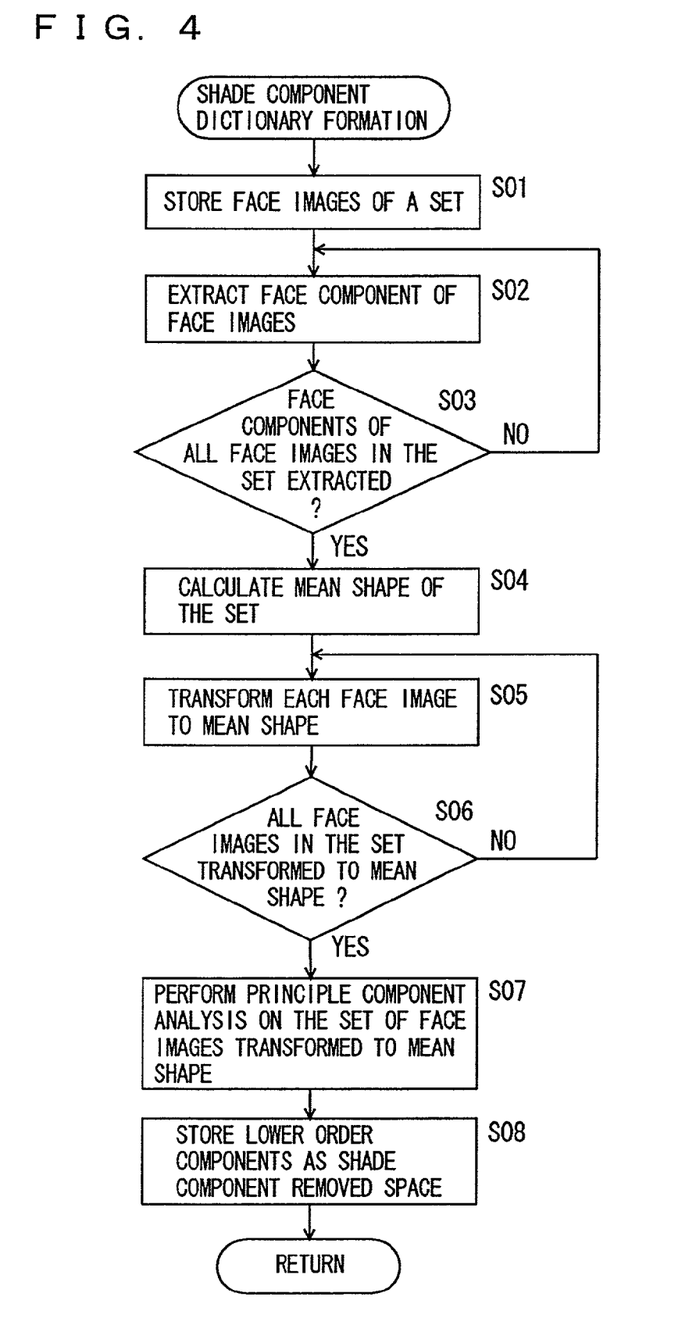
FIG. 4 is a flow chart representing the flow of the process for forming shade component dictionary performed in the shade component removing apparatus.

FIG. 4 is a flow chart showing the flow of the process for forming shade component dictionary performed in the shade component removing apparatus. Referring to FIG. 4, first, a plurality of face images are stored in the face image data base of the storing unit 104 (step S01). The stored face images are considered to be a set of face images for generating a dictionary space, that will be described later. The face images to be stored in the face image data base may be input through the image input unit 102, or face images stored in a recording medium 107 may be read through an external storing apparatus 106.

From the face images stored in face image data base of storing unit 104, face image by face image, the contour of the face and portions such as the eyes, nose, mouth and eye brows of the face included in the face image are extracted and the shapes thereof are recognized (step S02). Recognition of the shape is performed by using feature points. Whether or not the operation of step S02 has been executed or not for all the face images in the set stored in the face image data base is determined (step S03). When the step S02 has been executed for all the face images, the flow proceeds to step S04, and otherwise, step S02 is repeated.

Thereafter, the mean shape of the face is calculated for the set of face images (step S04). The calculated mean shape is stored in storing unit 104. The mean shape is calculated by using the shape recognized in step S02. Further, calculation of the mean shape is performed by using the normalized image, normalized by the size of the face included in the face images.

Thereafter, the face images included in the set is one by one transformed to the calculated mean shape, and mean face images are generated (step S05). Transformation to the mean shape is performed by using the feature points. Regions other than the feature points are also transformed by linear transformation.

Whether all the face images included in the set have been transformed to the mean shape or not is determined (step S06). When all the face images included in the set have been transformed to the mean shapes, the flow proceeds to step S07, and otherwise the step S05 is repeated.

Pixel values of the mean face images generated in step S05 are regarded as vectors, and eigen vectors and eigen values are calculated using the eigen space method. The calculated eigen vectors are stored as a dictionary space having these as base vectors, in storing unit 104.

From the generated dictionary space, a shade component is extracted, and a shade component removed space is generated. In the generated dictionary space, first to fourth components having larger eigen values in this order are extracted as shade components, and of the eigen vectors defining the dictionary space, the eigen space having the fifth and the following components as base vectors is stored as the shade component removed space, in storing unit 104 (step S08). The first to fourth components represent the offset component for normalizing the texture of the face image and the components of three degrees of freedom in the direction of light source as the illuminating condition.

When the face images included in the set are the images with the texture normalized, in step S08, in the dictionary space, first to third components having larger eigen values in this order are extracted as shade components, of the eigen vectors defining the dictionary space, an eigen space having the fourth and the following components as base vectors is stored as the space with the shade component removed, in storing unit 104. The first to third components represent components of three degrees of freedom in the direction of light source as the illuminating condition.

Figure 5:
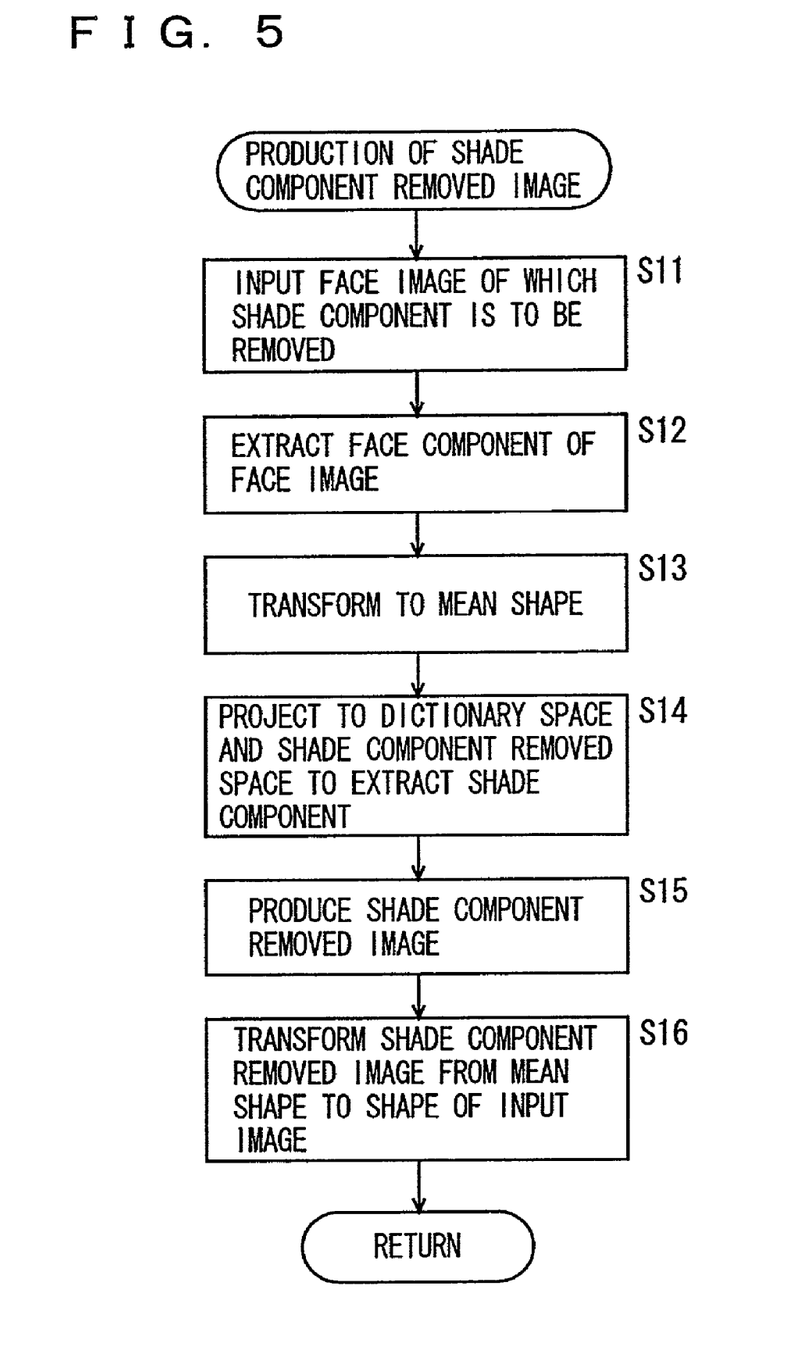
FIG. 5 is a flow chart representing the flow of the process for producing a shade component removed image, performed in the shade component removing apparatus.

FIG. 5 is a flow chart showing the flow of the process for producing the shade component removed image, performed by the shade component removing apparatus. Referring to FIG. 5, in the process for producing the shade component removed image, first, a face image to be newly processed is input (step S11). The newly input face image is the image from which the shade component is to be removed. The face image is input through the image input unit 102.

From the newly input face image, the contour of the face and various portions of the face such as the eyes, nose, mouth and eyebrows are extracted (step S12). Thus, the shape of the face included in the input face image is recognized.

The face image with the face shape recognized is transformed to the mean shape (step S13). As the mean shape, the mean shape stored in the storing unit 104 is used. Thus, the shape of the face included in the newly input face image is adjusted to match the face shape represented by the dictionary space and the shade component removed space stored in the storing unit 104. The equation for transformation to the mean shape is stored in a memory, to be used in step S16 of inverse-transforming the mean shape back to the original face shape.

Thereafter, the face image that has been transformed to the mean shape is projected to the dictionary space to find a dictionary parameter, and the face image that has been transformed to the mean shape is projected to the shade component removed space, to find a removal parameter (step S14). As the dictionary space and the shade component removed space, the dictionary space and the shade component removed space stored in storing unit 104 are used. In the dictionary space, the image represented by the dictionary parameter is referred to as a dictionary image, and in the shade component removed space, an image represented by the removal parameter is referred to as removal image.

By operating corresponding pixel values of the face image transformed to the mean shape, dictionary image and the removal image in accordance with the equation (1) above, a shade component removed image, that is, the face image with the shade component removed is produced (step S15).

The produced shade component removed image is inverse-transformed to the shape of the face included in the input face image (step S16). The transformation equation for inverse transformation is calculated based on the transformation equation to the mean shape found in step S13. Thus, the shape of the shade component removed image is transformed to the shape of the input face image.

As described above, in the shade component removing apparatus 100 of the present embodiment, the dictionary space is generated by using a set of images obtained by picking-up under the illuminating condition with the light source direction unlimited. Therefore, it is unnecessary to particularly specify the illuminating condition of the images used for generating the dictionary space, and the dictionary space can be generated easily.

As the dictionary space is generated by using images of which light source directions are various and many, it is possible to remove the shade component from a face image picked-up under such illuminating condition in that the light comes from an arbitrarily direction.

Further, in generating the dictionary space and removing the shade component, a mean face image obtained by transforming the face image with the face shape normalized to the mean shape is used. Therefore, shade component can be removed even from a face image of a person who was not among the persons whose face images were used for generating the dictionary space.

Further, as it is possible to remove shade component from all face images picked-up under various illuminating conditions and from face images of every person, it is possible to collect images for recognition without the necessity of establishing constant image pick-up condition.

Though principle component analysis has been described as an example in the embodiments above, other method of multi-variate analysis may be used. Though a shade component removing apparatus has been described in the embodiments above, the present invention can also be implemented as a method of removing shade component, executing the process represented by the flow charts of FIGS. 4 and 5, as well as the recording medium recording the shade component removing program.

The shade component removing apparatus in accordance with the present embodiment is also applicable to images other than face images. For example, the shade component can be removed from an image of a human body as a whole.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for removing a shade component from an image, comprising:
    calculating section for performing principle component analysis on a set of face images having various types of shades to generate an eigen space;
    storing section for storing the eigen space generated by said calculating section;
    input section for receiving as an input a new face image;
    projecting section for projecting the face image input through said input section to the eigen space stored in said storing section; and
    producing section for producing a face image with shade component removed, based on the face image input through said input section and the image projected by said projecting section to the eigen space, wherein
    said calculating section includes
        face component extracting section for extracting shape of each portion of each of the face images;
        mean shape calculating section for calculating a mean shape for the set of said face images;
        mean shape transforming section for transforming each face image to the calculated mean shape; and
        principle component analyzing section for performing principle component analysis on the face images transformed to the mean shape to calculate eigen vectors to be base vectors of the eigen space.

2. The apparatus for removing a shade component from an image according to claim 1, wherein
    said projecting section includes
    face component extracting section for extracting shape of each portion of the input face image;
    mean shape transforming section for transforming the input face image to the mean shape calculated by said calculating section; and
    eigen vector projecting section for projecting the face image that has been transformed to said mean shape to said eigen space.

3. The apparatus for removing a shade component from an image according to claim 2, wherein
    said producing section calculates a difference component between the image projected to said eigen space and an image with shade component removed projected to said eigen space, and subtracts the difference component from the face image input through the input section, so as to produce a face image with the shade component removed.

4. The apparatus for removing a shade component from an image according to claim 3, wherein
    first to third or fourth components of the image projected to said eigen space represent an image influenced by the shade component.

5. The apparatus for removing a shade component from an image according to claim 3, further comprising
    inverse transforming section for recovering shape of the face image produced by said producing section from the mean shape to a shape of the original face image.

6. An apparatus for removing a shade component from an image, comprising:
    calculating means for performing statistical processing on a set of images having various types of shades, for calculating a prescribed image space;
    storing means for storing the image space calculated by said calculating means;
    input means for receiving as an input a new image;
    projecting means projecting the image input through said input means to the image space stored in said storing means; and
    producing means for producing an image with shade component removed, based on the image input through said input means and the image projected to the image space by said projecting means, wherein
    said calculating means includes
        face component extracting section for extracting shape of each portion of each of the face images;
        mean shape calculating section for calculating a mean shape for the set of said face images;
        mean shape transforming section for transforming each face image to the calculated mean shape; and
        principle component analyzing section for performing principle component analysis on the face images transformed to the mean shape to calculate eigen vectors to be base vectors of the eigen space.

7. The apparatus for removing a shade component from an image according to claim 6, wherein the images having various types of shades included in said set and the image input through said input means represent subjects of the same type.

8. A method of removing a shade component from an image, comprising the steps of:
    performing principle component analysis on a plurality of face images having various types of shades,
    said step of performing principle component analysis including the step of calculating eigen vectors and eigen values using eigen space method, regarding pixel values of face images as vectors;
    forming a dictionary space having said calculated eigen vectors as base vectors;
    forming a shade component removed space having a lower order component obtained by the step of performing principle component analysis as a base vector;
    generating a dictionary image by applying a face image, from which shade component is to be removed, to said dictionary space;
    generating a removal image by applying said face image, from which shade component is to be removed, to said shade component removed space; and
    subtracting difference between said dictionary image and said removal image from said face image from which shade component is to be removed, to generate a face image with the shade component removed.

9. The method of removing a shade component from an image according to claim 8, wherein
    said plurality of face images having various types of shades are images transformed to mean shapes obtained by averaging shapes of a plurality of original face images;
    said face image from which shade component is to be removed is an image transformed to said mean shape;
    said method further comprising the step of
    performing inverse transformation of said transformation on the face image with the shade component removed, so as to recover the shape of the original face image from said face image with the shade component removed.

10. A method for removing a shade component from an image, comprising:

performing principle component analysis on a set of face images having various types of shades to generate an eigen space;
storing the eigen space that is generated;
receiving as an input a new face image;
projecting the input new face image to the stored eigen space; and
producing a face image with shade component removed, based on the input new face image and the new face image projected to the stored eigen space wherein
performing principle component analysis includes
extracting shape of each portion of each of the face images;
calculating a mean shape for the set of said face images;
transforming each face image to the calculated mean shape; and
performing principle component analysis on the face images transformed to the mean shape to calculate eigen vectors to be base vectors of the eigen space.

11. An apparatus for removing a shade component from an image, comprising:

calculating section for performing principle component analysis on a set of face images having various types of shades to generate an eigen space;

storing section for storing the eigen space generated by said calculating section;

input section for receiving as an input a new face image;

mean shape transforming section for transforming the new face image to a mean shape;

projecting section for projecting the face image transformed by said mean shape transforming section to the eigen space stored in said storing section;

producing section for producing a face image with, shade component removed, based on the image projected by said projecting section to the eigen space; and inverse transforming section for inverse transforming the shade component removed image to an original shape.

* * * * *